United States Patent Office 3,364,019
Patented Jan. 16, 1968

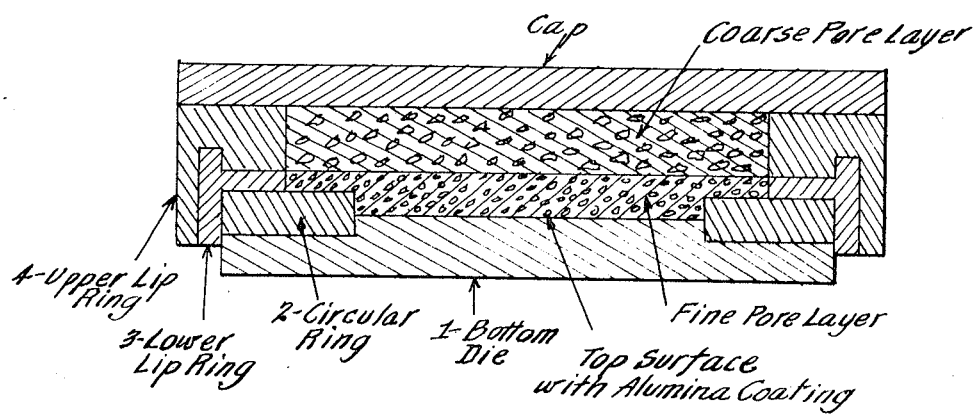
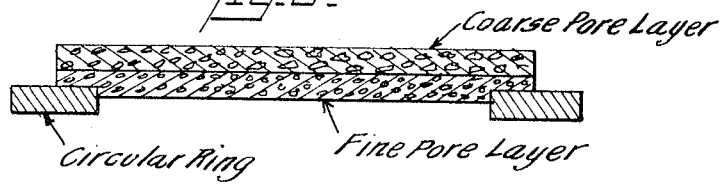

3,364,019
METHOD OF MAKING FUEL CELL ELECTRODES
William E. Houghtby, Portland, and A. David Joseph, South Windsor, Conn., assignors, by mesne assignments, to Leesona Corporation, Warwick, R.I., a corporation of Massachusetts
Continuation-in-part of application Ser. No. 111,106, May 18, 1961. This application Jan. 21, 1965, Ser. No. 429,204
9 Claims. (Cl. 75—208)

This application is a continuation-in-part of co-pending application Ser. No. 111,106, filed May 18, 1961 now abandoned.

This invention relates to improved bi-porous fuel cell electrodes and more particularly to bi-porous fuel cell electrodes having a controlled or reproducible structure and to their method of manufacture.

The term "fuel cell" as used herein embraces an electrochemical cell in which the free energy of the cell is converted directly into electrical energy. In the prior art, electrodes for such fuel cells have generally consisted of microporous structures (pore sizes ranging from about 1 to about 100 microns) which are electrically conducting and electrochemically active. These electrodes permit the establishment of an interface of solid active electrode, gaseous or liquid fuel and ionic electrolyte either by difference in the structure, such as the use of a dual porosity layer or by contacting the electrode interface with a matrix retaining the electrolyte. At the interface, the fuel or oxygen is chemisorbed, with ion exchange taking place through the electrolyte and ion transfer taking place through the electrically conducting electrode. The electrical charge is drained from the electrode to an external circuit and the fuel ions react with the oxidizing ions in the electrolyte to form a neutral product.

According to the prior art, bi-porous fuel cell electrodes are constructed by applying a metal powder-ammonium bicarbonate mixture to a perforated back-up plate, followed by compaction under pressure and the structure sintered to form a coarse pore layer. The fine pore layer is prepared by hand application of a nickel-alcohol slurry to the coarse pore layer, and the total structure sintered. Repeated application of the nickel-alcohol slurry is continued until a satisfactory permeability or "bubble pressure" is obtained.

These bi-porous electrodes, wherein the larger pores face the fuel gas and the small pores front the electrolyte, have been enthusiastically received since they eliminate, to a large extent, the problem of electrode flooding or having the reactant gases bubble through the electrode into the electrolyte unconsumed. However, such electrodes have shortcomings inasmuch as the pore size of the layers is not controlled or reproducible. Additionally, particularly since the manufacturing process requires several individual sintering steps, the electrodes are expensive.

Accordingly, it is an object of the instant invention to provide a bi-porous electrode having controlled and reproducible pore size and pore size distribution.

It is another object of this invention to provide a method of manufacturing the bi-porous electrode requiring only one sintering operation.

It is another object of this invention to provide relatively inexpensive bi-porous fuel cell electrodes.

These and other objects of the invention will become more apparent from the following detailed description with particular emphasis being placed upon the detailed examples.

In general, the objects of the invention are obtained by preparing a fine pore layer by placing a ring with a lip of the proper thickness, usually of from about 0.003 inch to about 0.30 inch over an alumina-coated disc, placing a powder of select fine particle size on the disc and striking off the excess powder so that a layer of powder approximately the thickness of the lip remains. A ring with a larger lip, usually from about 0.07 inch to about 0.17 inch, is then placed over the entire fine pore assembly and a select coarse particle size powder is carefully sifted into the ring and leveled off at the surface of the coarse pore ring. The powders are then compacted, as, for example, by vibratory or pressure techniques, and sintered. It has been found that vibratory compaction is superior to pressure compaction. The sequence of the above steps is critical to enable vibratory compaction. Thus, if the fine particle isze powder is placed on top of the coarse layer and compacted by vibration, the porosity control would be effected, with possible complete fusion of the metal powders at the interface of the two layers.

In the presently described method, the particle sizes of the metal powders is critical to obtain the desired, reproducible pore size. Thus, the particle size of the metal powder for producing the fine pore layer can range up to 12 microns with the particle size of the powders for producing the coarse pore layer being from 15 to 100 microns. It has been found that there is a direct correlation between the pore size obtained and the particle size of metal powders used, the pore size being approximately equal to one-third of the particle size of the powder. In the fine pore layer, therefore, if the pore diameter is to be from 1½ to 3 microns, a metal powder having a particle size up to 12 microns will be selected. If the pore diameter of the coarse pore layer is to be 5 to 30 microns, a metal having a particle size of from 15 to 100 microns will be used. It is desirable not to have the particle size of the fine pore layer overlap with the particle size of the coarse pore layer since, if overlapping does occur, the sharp contrast at the interface of the layers will not be obtained.

Studies made in conjunction with this invention have shown the following:

(1) That pore size of the plate is linearly dependent upon the mean particle size for spherical particles if vibratory compaction is used, with the following relationship being obtained if the sintering is carried out at a temperature of 1830° F. for 45 minutes in an atmosphere of 90 percent argon and 10 percent hydrogen:

$$P = 0.282D + 1.70$$

where $P$ = mean pore size (microns), and $D$ = mean particle diameter (microns);

(2) That pore size distribution is dependent upon particle size distribution; a narrow particle size distribution resulting in a correspondingly narrow pore size distribution, however, a large decrease in particle size must be obtained for a small reduction of pore size range;

(3) That total porosity is independent of spherical particle size in vibratory compaction, achieving a value of 44 percent except for small particles which do not achieve optimum packing;

(4) That ultimate tensile strength and ductility are dependent upon mean particle size and sintering temperature with higher strength and ductility being obtained for increasingly smaller particle sizes at higher temperatures;

(5) That electrodes constructed of spherical nickel particles can be successfully sintered in pure hydrogen without excessive shrinkage, however, those composed partially or totally of carbonyl powders must be sintered in an atmosphere with a low hydrogen content (10 percent);

(6) That process variables such as sintering time and temperature, vibratory direction, amplitude and time, affect electrode structures in different manners as detailed hereinafter; and (7) A greater degree of reproducibility and a narrower pore size range is obtained by use of spherical rather than carbonyl nickel powders. These features and their criticality will become more apparent from the following more detailed discussion.

In the present invention, metallic and carbon powders can be conveniently used in fabricating the described electrodes. However, spherical nickel powders have been found to be particularly desirable inasmuch as they permit convenient separation into size portions, allowing a mathematical analysis of porosity and pore size. For a group of single sized particles, various types of packing are possible. If two different particle size powders are mixed, porosity decreases in a manner depending upon the ratio of particle diameters. A single size, or sharply graded powder is, therefore, preferred for maximum porosity and controlled pore size.

There are many graded powders available commercially for use in the manufacture of the instant electrodes. Table I sets forth a number of nickel powders and pertinent data thereof including shape, mean particle size, particle size range, and specific gravity which are particularly suitable in this invention. While this table is limited to nickel powders, it is, of course, possible to employ other metallic powders such as metals found in Group VIII and I–B in the Periodic Table as well as carbon. These materials are available commercially and their proper selection is within the ability of one skilled in the art.

TABLE I.—SHAPE AND SIZE DISTRIBUTION OF GRADED NICKEL POWDERS

| Reference Code | Shape | Mean Particle Size (microns) | Particle Size Range (microns) | Specific Gravity |
|---|---|---|---|---|
| 6±3 | Spherical | 6 | [1] 4–9.8 | 8.851 |
| 12±6 | do | 12 | [1] 6–17 | 8.801 |
| 24±9 | do | 13 | [2] 4–21 | 9.23 |
| 21±10 | do | 21 | [1] 12–32 | 8.863 |
| 22±7 | do | 22 | [1] 15.5–28 | 8.412 |
| 27±15 | do | 24 | [1] 7–47 | |
| 27±10 | do | 27 | [1] 18.5–33 | 9.095 |
| 30±14 | do | 30 | [1] 21.5–41 | 8.905 |
| 37±12 | do | 37 | [1] 25–49 | 8.912 |
| 42±12 | do | 42 | [1] 30–54 | 8.632 |
| 66±6 | do | 66 | [2] 60–72 | 8.8143 |
| 87±12 | do | 87 | [2] 75–98 | 6.2976 |

[1] Powder size distribution was determined by a free settling air column method. In this procedure, a quantity of the powder is permitted to fall by gravity into a tube in which there is an upward flow of gas of free circulating velocity. The coarser, heavier particles fall more rapidly to the bottom thereby permitting particle separation.

[2] Powder distribution determined by optical count. Actual optical count corresponds to free settling air column for mean particle size but gives a broader particle size distribution.

The methods of compaction used in the manufacture of the instant electrodes include the use of both pressure and vibratory techniques. In employing the pressure method, it is possible to vary the pressure over a relatively wide range. For example, nickel powders were pressed at pressures as low as 800 p.s.i. and as high as 8,000 p.s.i. If other metals are employed, the conditions can be varied to suit the particular properties of the metals. However, preferably the pressures employed will range from about 500 p.s.i. to about 8,000 p.s.i., depending upon the powder selected, as well as sintering temperatures. The experimental work conducted indicates that the mean pore size, pore size range, total porosity, and linear shrinkage are all decreased as both the mean particle size and compacting pressure are increased. The open porosity is decreased as the mean particle size is increased and is relatively unaffected by pressure. The mean pore size and total porosity apparently are a function of compacting pressure whereas the open porosity is a function of mean particle size. Thus, a manufacturing technique employing pressure compaction of spherical powders will control both pore size and open porosity and allow the use of less closely graded powders. However, porosities obtained by pressure compaction are consistently lower than those obtained by vibratory compaction. Data obtained using pressure compaction is set forth in Table 2.

TABLE 2.—PROPERTIES OF PRESSURE COMPACTED SAMPLES MADE WITH VARIOUS SIZE SPHERICAL NICKEL POWDERS

| Powder Size (microns) | Pressure (p.s.i.) | Shrinkage (Percent) | Mean Pore Size (microns) | Pore Size Range (microns) | Total Porosity (Percent) | Open Porosity (Percent) |
|---|---|---|---|---|---|---|
| 21±10 | 1,000 | 1.57 | 5.8 | 3.0– 7.6 | 40.3 | 35.2 |
| 21±10 | 3,000 | 1.38 | 5.7 | 2.2– 7.0 | 40.3 | 32.5 |
| 21±10 | 5,000 | 1.18 | 5.5 | 2.7– 7.0 | 40.6 | 29.0 |
| 24±9 | 1,000 | 0.39 | 8.5 | 3.2–12.0 | 41.1 | 27.8 |
| 24±9 | 3,000 | 0 | 7.3 | 3.2–12.0 | 41.8 | 36.2 |
| 24±9 | 5,000 | 0.20 | 7.5 | 3.4–12.0 | 41.1 | 30.8 |
| 27±15 | 1,000 | 0.98 | 6.4 | 2.6–12.0 | 41.7 | 13.5 |
| 27±15 | 3,000 | 0.98 | 5.9 | 2.5–10.0 | 38.3 | 23.8 |
| 27±15 | 5,000 | 0.79 | 5.5 | 2.2– 8.0 | 38.5 | 14.4 |

Sinter Condition: 15 min. at 1830° F. in .90A–.10H atmosphere.

In employing the vibratory compaction process, the metal powders are placed in a suitable container such as an alumina-coated metal dish approximately 3 inches in diameter and ⅛ of an inch deep and vibrated. The discs obtained are then sintered. It is possible to use any of the vibrators available in the art, as for example, the Syntron vibrator which produces lateral motion or a vibrating table which produces vertical motion. It is possible to vary the amplitude, time of vibration and powder particle size in order to obtain electrodes suitable for a particular end use. For example, eight size ranges of graded nickel powders were laterally vibrated on a Syntron vibrator at an amplitude of 0.008 inch for three minutes and sintered at 1830° F. for 45 minutes in a 90 percent argon and 10 percent hydrogen atmosphere. Data obtained from these tests are listed in Table 3.

TABLE 3.—PROPERTIES OF VIBRATORY COMPACTED SAMPLES MADE WITH VARIOUS SIZE NICKEL POWDERS

| Powder Size (microns) | Mean Pore Size (microns) | Pore Size Range (microns) | Total Porosity (percent) | Open Porosity (percent) |
|---|---|---|---|---|
| 6±3 | 2.9 | 1.2– 5.0 | 54.2 | 38.8 |
| 22±7 | 7.2 | 3.5–10.0 | 46.1 | 36.2 |
| 27±10 | 8.5 | 4.0–11.0 | 48.2 | 37.7 |
| 30±14 | 10.5 | 5.0–17.0 | 43.5 | 35.4 |
| 37±12 | 14.0 | 5.9–19.0 | 43.7 | 32.3 |
| 45±13 | 14.0 | 7.8–17.0 | 43.4 | 34.0 |
| 66±6 | 22.0 | 11.0–27.0 | 43.6 | 28.3 |
| 87±12 | 27.0 | 17.0–33.0 | 43.5 | 27.4 |

Vibratory Condition: Lateral vibration at an amplitude of 0.008 inch for 3 minutes.
Sinter Conditions: 45 minutes at 1,830° F. in a .90A–.10H atmosphere.

It is apparent from the data that the sintered mean pore size increases linearly as a function of mean spherical nickel particle size and can be computated from the following relationship when sintered at 1830° F. for 45 minutes in a 90 percent argon and 10 percent hydrogen atmosphere:

$$P = 0.282D + 1.70$$

where:

$P$ = mean pore size (microns)
$D$ = mean particle diameter (microns).

The results are reproducible with very little scatter in mean pore size. Observed pore size values are decreased less than 10 percent when the sintering temperature is increased to 2100° F., the effect of temperature being discussed hereinafter.

Total porosity using nickel particles, decreases to a minimum of 44 percent as the mean particle size increases and is constant at this value beyond an apparently critical particle size at 30 microns. The higher porosities obtained for smaller particle diameters may be due to an inability to approach ideal "packing." Thus, the pore size range is dependent on particle size range, however, it is noted that a large reduction of particle size range is required to obtain a small reduction in sintered pore size range.

Variation of vibratory amplitudes causes the mean pore size and open porosity to be altered; the pore size range narrows slightly and total porosity remains nearly constant as the amplitude is increased. Further, it has been found that if the time of vibration is varied, the mean pore size and total and open porosities decreases slightly as the time of vibration is increased. The limits of pore size range are decreased as the vibrating time is increased, but the pore size range is not narrowed appreciably with longer vibratory times.

The sintering of the instant electrodes after compaction can be carried out in any of the usual sintering furnaces, for example, a retort incline furnace. It is possible and often desirable to sinter the samples according to a predetermined cycle. For example, the cycle may consist of preheating to 800° F. for 20 minutes, sinter at a temperature of from 1200 to 2400° F. for from about 10 to 80 minutes, cooling at 800° F. and 400° F. for 20 minutes each. It is found that as the sintering temperature is varied, the open porosity decreases and linear shrinkage increases with increased sintering temperatures. Total porosity, mean pore size range, and pore size range are decreased less significantly by an increased sintering temperature. Several dual porosity electrodes were made with graded Federal Mogul powders. They were vertically vibrated at three minutes at an amplitude of 0.004 inch. Electrodes were then sintered at 2100° F. and their properties compared to electrodes made with the same powders and by the same method but sintered at 1830° F. The data are listed in Table 4 and indicate that the mean pore size, pore size range and total porosity are all slightly decreased by the increased sintering temperature.

Open porosity is not significantly changed by this increased sintering temperature. Further, it has been found that the open porosity decreases and linear shrinkage increases directly with longer sintering times. Mean pore size, pore size range and total porosity are decreased slightly with longer sintering times, but they are decreased more appreciably by greater compacting pressures.

Variation in the sintering atmosphere also has a substantial effect upon the pore size, linear shrinkage, etc. For example, if the sintering takes place in an atmosphere of hydrogen as opposed to sintering in a 90 percent argon and a 10 percent hydrogen atmosphere linear shrinkage is decreased. It was noted, further, that linear shrinkage of carbonyl nickel powders increases with increasing hydrogen content in the sintering atmosphere. This indicates electrodes composed solely of graded spherical powders can be successfully sintered in pure hydrogen without excessive shrinkage.

Thus, as is apparent, through proper control of compacting techniques, sintering techniques, and by the judicious selection of the metal or carbon particles, electrodes having controlled and reproducible pore size, and porosity are formed. It is to be understood that the sintering and compacting thicknesses are to be controlled to produce the objectives of the invention such as a well-defined interface between the coarse and fine pore layers without excessive coalescence.

To more particularly describe the invention, Table 5 sets forth five preparations of dual porosity electrodes employing the novel technique of this invention using nickel powders. In interpreting these preparations, particular reference is directed to the drawing wherein FIGURE 1 is a cross-sectional view of an apparatus for making the dual porosity electrodes with the metal particles contained therein. FIGURE 2 is a diagrammatical view in cross-section of a finished bi-porous structure. The structures are prepared by placing a ring with a lip 3, upon a bottom die 1, having raised circular ring 2, and filling said lip with a metal powder of a select fine particle size and striking off the excess powder so that a layer of powder approximately the thickness of the lip remains. A second ring with a lip 4, which lip is preferably from about 0.030 to about 0.5 inch in thickness, is placed over the entire fine pore assembly and a select coarse particle size powder is carefully shifted into the ring and leveled off at the surface of the coarse pore ring. A cap is placed over the assembly and the powders compacted and sintered.

In these descriptive embodiments, vibratory compaction was employed with lateral displacement at an amplitude of 0.004 inch for three minutes. Sintering was carried out in an inclined retort furnace at a temperature of 1830° F. in an atmosphere of 90 percent argon and 10 percent hydrogen for 45 minutes.

TABLE 4.—PROPERTIES OF DUAL POROSITY ELECTRODES MADE WITH NICKEL POWDERS SINTERED AT 1830 AND 2100° F.

| Powder Size (microns) | Mean Pore Size (microns) | | Pore Size Range (microns) | | Total Porosity (Percent) | | Open Porosity (Percent) | |
|---|---|---|---|---|---|---|---|---|
| | 1,830 F. | 2,100 F. | 1,830 F. | 2,100 F. | 1,830 F. | 2,100 F. | 1,830 F. | 2,100 F. |
| 6±3 | 2.5 | 2.6 | 1.8- 3.5 | 1.8-4.0 | 49.7 | 42.7 | ------ | ------ |
| 27±10 | 11.0 | 9.0 | 8.0-18.0 | 5.5-16 | 51.6 | 46.9 | ------ | ------ |
| 66±6 | 20 | 18 | 15-29 | 12-23 | 44.0 | 42.0 | 30.0 | 27.8 |
| 87±12 | 29 | 27 | 17-48 | 13-35 | 50.7 | 44.8 | 27.1 | 27.9 |

Vibratory conditions: Vertical vibration for 3 min. at an amplitude of 0.004".
Constant sinter conditions: 45 min. at temperature in a .90A-.10H atmosphere.

TABLE 5.—DESIRED AND OBTAINED STRUCTURES OF DUAL POROSITY ELECTRODES MADE BY USING NICKEL POWDERS

| Example Number | PORE SIZE (Microns) | | | |
|---|---|---|---|---|
| | Fine Pore | | Coarse Pore | |
| | Predicted | Actual | Predicted | Actual |
| 1 | 3 | 2.6 | 7 | 10 |
| 2 | 1 | 1.2 | 14 | 14 |
| 3 | 3 | 2.8 | 20 | 20 |
| 4 | 3 | 3.3 | 30 | 29 |
| 5 | 2 | 2.2 | 7 | 9.5 |

It is apparent from the above data that the predicted pore size of both the fine pore and coarse layers are extremely close to those actually obtained. As one would expect, there is a greater variation between the predicted and actual in the fine pore structure.

It should be appreciated that the instant invention is not to be construed as being limited by the illustrative examples. It is possible to produce still other embodiments without departing from the inventive concept herein disclosed. Such embodiments, including the structures used as filters, etc., are within the ability of one skilled in the art. It is further noted that for purposes of this specification and claims, "metal" powders include carbon powders.

It is claimed and desired to secure by Letters Patent:

1. The method of making improved bi-porous electrodes having a well-defined interface between the coarse and fine pore layers and controlled and reproducible pore size and porosity comprising the steps of (1) forming a fine pore layer in a retainer from metal powders having a particle size of up to 12 microns; (2) placing a second retainer over the first retainer and filling said second retainer with a metal powder having a particle size of from 15 to 100 microns; (3) compacting sufficiently to settle the metal powders while preventing intermixing of the powder from the fine pore layer with the powder from the coarse pore layer; and (4) heating sufficiently to bond the metal powders together and to maintain the well-defined interface without excessive coalescence.

2. The method of making improved bi-porous electrodes having a well-defined interface between the coarse and fine pore layers and controlled and reproducible pore size and porosity comprising the steps of (1) preparing a fine pore layer by placing a ring having a lip over a suitable disc, adding a metal powder having a particle size of up to 12 microns to the disc and ring so that a layer of powder approximately the thickness of the lip remains; (2) placing a second ring having a lip over the entire fine pore assembly and adding a select metal powder having a particle size of from 15 to 100 microns; (3) compacting sufficiently to settle the metal powders while preventing intermixing of the powder from the fine pore layer with the powder from the coarse pore layer; and (4) heating sufficiently to bond the metal powders together and to maintain the well-defined interface without excessive coalescence.

3. The method of claim 2 wherein the compaction is carried out by vibratory techniques.

4. The method of making a bi-porous structure having a well-defined interface between the coarse and fine pore layers and controlled and reproducible pore size and porosity comprising the steps of (1) preparing a fine pore layer by placing a ring with a lip of from about 0.003 inch to about 0.30 inch over a suitable disc and adding a powder having a particle size up to 12 microns to the disc and ring so that a layer of powder approximately the thickness of said lip remains; (2) inserting a ring with a lip of approximately 0.07 inch to 0.17 inch over the entire fine pore assembly and adding a metal powder having a particle size of from 15 to 100 microns to said ring; (3) compacting sufficiently to settle the metal powders while preventing intermixing of the powder from the fine pore layer with the powder from the coarse pore layer; and (4) heating sufficiently to bond the metal powders together and to maintain the well-defined interface without excessive coalescence.

5. The method of claim 4 wherein the compacting is carried out by vibratory techniques.

6. The method of making a bi-porous fuel cell electrode having a well-defined interface between the coarse and fine pore layers and controlled and reproducible pore size and porosity comprising the steps of (1) preparing a fine pore layer by placing a ring with a lip of from about 0.003 inch to about 0.30 inch over a suitable disc and adding a powder having a particle size of up to 12 microns to the disc and ring so that a layer of powder approximately the thickness of said lip remains; (2) inserting a ring with a lip of approximately 0.07 inch to about 0.15 inch over the entire fine pore assembly and adding a metal powder having a particle size of from 15 to 100 microns to said ring; (3) compacting sufficiently to settle the metal powders while preventing intermixing of the powder from the fine pore layer with the powder from the coarse pore layer; and (4) heating sufficiently to bond the metal powders together and to maintain the well-defined interface without excessive coalescence.

7. The method of claim 6 wherein the metal powder is spherical nickel and the heating step is carried out in an atmosphere of 90 percent argon and 10 percent hydrogen.

8. The method of claim 6 wherein the metal powder is carbonyl nickel and the heating step is carried out in an atmosphere of 90 percent argon and 10 percent hydrogen.

9. The method of claim 6 wherein the compacting is carried out by vibratory techniques.

References Cited

UNITED STATES PATENTS

| | | | |
|---|---|---|---|
| 2,267,918 | 3/1940 | Hildabolt | 75—222 |
| 2,464,517 | 5/1943 | Kurtz | 75—208 |
| 3,226,263 | 12/1965 | Oswin | 136—86 X |

FOREIGN PATENTS 369,964   3/1932   Great Britain.

OTHER REFERENCES

Goetzel: Treatise on Powder Metallurgy, vol. II, Interscience Publishers Inc., New York 1950, pp. 530–535.

L. DEWAYNE RUTLEDGE, *Primary Examiner.*

BENJAMIN R. PADGETT, *Examiner.*

A. J. STEINER, *Assistant Examiner.*